Patented May 29, 1945

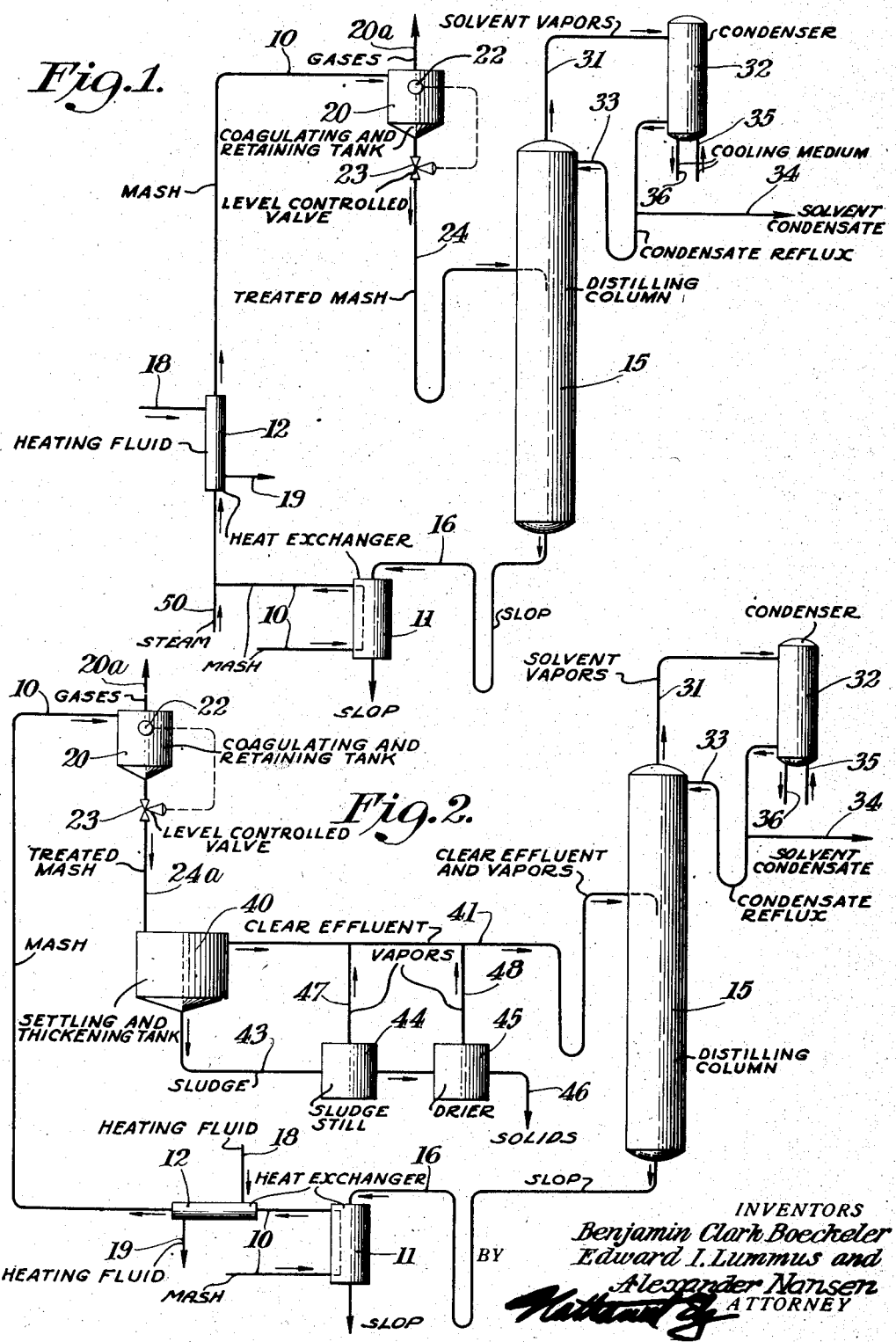

2,376,898

UNITED STATES PATENT OFFICE 2,376,898

DISTILLATION OF FERMENTER MASH

Benjamin Clark Boeckeler, New York, N. Y., and Edward I. Lummus, Montclair, and Alexander Nansen, Bernardsville, N. J., assignors to The Lummus Company, New York, N. Y., a corporation of Delaware Application November 26, 1940, Serial No. 367,226

13 Claims. (Cl. 202—61)

This invention relates to improvements in the distillation of fermented mashes.

In the production of butyl alcohol and other solvents by the fermentation of certain carbohydrate materials such as molasses mashes by butyl alcohol-forming bacteria, it is customary to subject the fermented mash to a distillation operation for the recovery of the solvents. It has been our experience that the distillation of butyl mashes is greatly impeded by their bad foaming tendency, the severity of which generally depends on the particular organism selected for the fermentation.

This foaming tendency considerably impairs efficient operation of the distilling step. Since the foam occupies most of the space between adjacent decks in the distilling column, the allowable vapor velocity is necessarily very low to prevent puking. An abnormally large diameter column is thus required to handle a given throughput.

Since the foam carries solid particles from the liquid on the decks, it tends to plug the vapor risers and other vapor passages in the bubble caps because of the deposition of the solid particles therein. If perforated plates instead of bubble decks are used, a similar result occurs; for the solid particles are then deposited on the under side of the plates, the holes in which are thereby gradually plugged. In either case, frequent cleaning of the distilling column is necessary for continuance of operation.

The principal object of our invention is to subject the fermented butyl mash prior to its introduction into a distilling column to a treatment which greatly reduces its foaming tendency whereby a high throughput is obtained and can be maintained and continuous operation can be extended over a longer period.

A more specific object of the invention is to render ineffective certain solid materials in the fermented mash prior to the distillation thereof, which solid materials, it is our belief, are primarily responsible for foaming. So far as we have been able to ascertain, these solid materials are present in the mash either in a very fine suspension or in solution.

Further objects and advantages of the invention will appear from the following description thereof taken in connection with the attached drawing, in which:

Fig. 1 is a diagrammatic flow sheet of one embodiment of our improved mash treating process;

Fig. 2 is a modification of the embodiment of Fig. 1.

In accordance with our invention, a fermented butyl mash is heated prior to distillation thereof to a temperature sufficient to effect coagulation of the solid materials responsible for foaming. The fermented material is then maintained at this temperature for a period of time sufficient to insure coagulation of all these solid materials. The treated mash may then be subjected directly to distillation. Alternatively, it may be allowed to stand to permit the coagulated material and other solids present to settle out; the clear effluent only is then subject to distillation.

By "butyl mash" we refer to a mash produced during a bacterial fermentation, the principal product of which is butyl alcohol although other solvents may be simultaneously formed.

A mash of this type contains a carbohydrate which is converted by inoculation with a bacteria of the butyl alcohol producing type, examples of which in the prior art are: *Clostridium saccharo-acetobutylicum*, U. S. Patent 2,089,522; *Clostridium saccharo-acetobutylicum-beta* and *Clostridium saccharo-acetobutylicum-gamma*, U. S. Patent 2,050,219; *Clostridium saccharo-acetobutylicum-alpha*, U. S. Patent 2,110,109; *Clostridium saccharo-butyl acetonicum liquefaciens*, U. S. Patent 2,139,108; *Clostridium saccharo-butyl acetonicum liquefaciens-gamma* and *Clostridium saccharo-butyl acetonicum liquefaciens-delta*, U. S. Patent 2,139,111.

These organisms have the primary characteristics of being motile rods, having oval endospores, which are usually central to subterminal; having flagella; and having a positive Gram stain for young cultures, becoming negative with older cultures. Ordinarily these organisms are anaerobic, usually obligate; do not liquefy gelatin; do not reduce nitrates; and produce predominant amounts of butyl alcohol, with minor amounts of ethyl alcohol.

In the practice of our invention, a fermented butyl mash is passed through line 10, in which are situated heat exchangers 11 and 12. In exchanger 11, the incoming mash is heated by means of the slop withdrawn from the bottom of distilling column 15 and discharged through line 16. In exchanger 12, the temperature of the mash is raised to a point sufficient to cause the finely suspended and dissolved solid material to coagulate. For this purpose a heating medium such as steam may be introduced in line 18 and removed through line 19. Our experience has shown that a temperature of from 185 to 205° F. is usually satisfactory for coagulation.

The heated mash is then passed to coagulating and retaining tank 20, wherein the mash is retained for a time sufficient to insure that coagulation of all the foam-causing material has taken place. Preferably this tank is insulated or provided with a steam jacket (not shown) so that the coagulating temperature may be maintained. Tank 20 is provided with vent 20a for the removal of any gases remaining in the mash. A liquid level control 22 operates valve 23 in line 24, through which the treated mash is passed to distilling column 15. For most butyl mashes a retaining time of 15 to 20 minutes is usually sufficient for complete coagulation. If desired, the mash may be subjected to agitation while retained in tank 20.

In column 15 the treated mash is subjected to the customary distillation for the separation of the solvents formed by the fermentation. Column 15 may be provided with bubble decks or perforated plates, whichever are desired. The solvent vapors are removed overhead at 31 and condensed in condenser 32. A portion of the condensate is preferably returned at 33 as reflux, and the remainder is withdrawn at 34 for further treatment as is well known. The condensate comprises butyl alcohol primarily and usually includes some ethyl alcohol and acetone. The kinds of other solvents and their amounts will depend on the particular organism employed as the fermenting agent. A cooling medium for condenser 32 may be introduced at 35 and removed at 36.

The slop, withdrawn from the bottom of column 15 and discharged from the system through heat exchanger 11, as already described, comprises the solids normally present in the mash and the solid material coagulated by the heat treatment in tank 20. Although the precise character of this coagulated material is unknown to us, it appears, by microscopic examination, that this material is composed primarily of the dead cells of the butyl organism used in the fermentation. It is also probable, however, that the coagulated material occludes a certain amount of insoluble debris from the fermenting medium. From observations during actual operation, it is our opinion that the material coagulated by the heat treatment is present in the fermented mash either as an extremely fine suspension or as a solution. It is also possible that this material may be present as a colloidal solution. The coagulated material appears as a flocculent precipitate, which readily settles, is gelatinous, and appears primarily organic in character.

In our experience with the fermentation of blackstrap molasses by butyl bacteria of the type known as Clostridium madisonii and described in the copending application of Elizabeth F. McCoy, S. N. 348,543, filed July 30, 1940, we have found that, when the fermented mash was charged directly to the distilling column without the initial heating and coagulating steps, the tendency of the mash to foam was so bad that the allowable overall vapor velocity, in one case, had to be reduced from the design rate of 2.5 feet per second to less than 0.75 foot per second; in this case, the spacing between decks was 18 inches. But, even with the reduced vapor velocity, the foam carried sufficient solid particles from deck to deck that the column had to be cleaned after a week's operation to remove the deposits plugging the vapor passages in the decks.

At the elevated temperature at which the fermented mash is maintained in retaining tank 20, substantially all of this finely dispersed or dissolved foam-forming solid material is coagulated. As a result, the tendency of the mash to foam during the subsequent distillation is almost entirely eliminated, and separation of the solvents is materially improved. The size of the column required to handle the throughput is also reduced.

The flow arrangement of Fig. 2 is a modification of that of Fig. 1. Similar reference numerals in the two drawings indicate the same or equivalent equipment.

In the flow arrangement of Fig. 2, the heated fermented mash is maintained in tank 20 at the desired elevated temperature for the period of time necessary to coagulate the foam-forming solid materials as in the treatment previously described. In this case, however, a clear liquid is first separated from the treated, fermented mash; for example, the treated mash may be conducted through line 24a to a settling and thickening tank 40, which may be of any well-known construction. The clear effluent from this tank is removed through line 41 and sent to distilling column 15 for recovery of the solvents. A centrifugal or other type filter may be used in place of thickener 40 to separate the solid material.

The sludge containing the solids normally present in the mash as well as the coagulated solids is removed from tank 40 through line 43 and may be passed to a sludge still 44 for recovery of the liquid retained therein. In this still the sludge may be subjected to a distillation, evaporation, or similar treatment. If desired, a filter of appropriate type may be substituted for sludge still 44. The residue from still 44 may then be further treated as in drier 45, wherein any liquid that may remain is driven off. The final dried product is removed at 46. The vapors from the operations carried out at 44 and 45 may be sent to column 15 through lines 47 and 48 respectively.

This dried product constitutes a valuable by-product of the solvent recovery process. It has a relatively high content of flavin and thus forms a good source of cattle feed. Analysis of the residue from one fermented mash produced by bacteria of the Clostridium madisonii type, indicated the flavin content was as high as 33 micrograms per gram.

If desired, steam may be introduced directly into line 10 as at 50 to provide the heat for coagulation. This method is less preferable than that heretofore described because it is not subject to so precise a control and is not so smooth in operation. In this case heat exchanger 12 may or may not be used.

Although we have described preferred forms of embodiment of our invention, we do not wish to be strictly limited thereto; therefore, only such limitations as appear in the claims appended hereinafter should be applied.

We claim:

1. In the distillation of a fermented butyl mash containing, in addition to the solids normally present, finely dispersed and dissolved solid organic material that causes excessive foaming during distillation, the method of substantially preventing foaming during distillation which includes injecting steam directly into the fermented mash prior to distillation to raise its temperature to that at which said solid material will coagulate, maintaining the mash at this temperature for a period of time sufficient to insure coagulation of all said solid material, and then distilling the mash to separate the solvents formed during fermentation.

2. In the distillation of a fermented butyl mash, in the formation of which an organism of the type *Clostridium madisonii* has been used as the fermenting agent, said mash containing, in addition to the solids normally present, finely dispersed and dissolved solid organic material that causes excessive foaming during distillation, the method of substantially preventing foaming during distillation which includes heating the fermented mash prior to distillation to a temperature of 185 to 205° F., at which temperature said solid material will coagulate, maintaining the mash at this temperature for a period of 15 to 30 minutes to insure coagulation of all said solid material, and then distilling the mash to separate the solvents formed during fermentation.

3. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid from said treated, fermented mash, and then distilling the clear liquid to recover the solvents formed during fermentation.

4. In the distillation of a fermented butyl mash containing, in addition to the solids normally present, finely dispersed and dissolved solid organic material that causes excessive foaming during distillation, the method of substantially preventing foaming during distillation which includes injecting steam directly into the fermented mash prior to distillation to raise its temperature to that at which said solid material will coagulate, maintaining the mash at this temperature for a period of time sufficient to insure coagulation of all said solid material, separating a substantially clear liquid from said treated, fermented mash, and then distilling the clear liquid to recover the solvents formed during fermentation.

5. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid from said treated, fermented mash by settling of the solids usually present and the coagulated solid material, and then distilling the clear liquid to recover the solvents formed during fermentation.

6. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid from said treated, fermented mash by filtration therefrom of the solids usually present and the coagulated solid material, and then distilling the clear liquid to recover the solvents formed during fermentation.

7. In the distillation of a fermented butyl mash containing, in addition to the solids usually present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid from the solids normally present and the coagulated solid material contained in said treated, fermented mash, recovering any further liquid retained by said separated solids, combining the liquid thus recovered with the clear liquid previously separated, and subjecting said liquids to distillation to recover the solvents formed during fermentation.

8. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid by settling of the solids normally present and the coagulated solid material contained in said treated, fermented mash, subjecting said separated solids to a distillation treatment to recover further liquid retained therein, combining the liquid thus recovered with the clear liquid previously separated, and subjecting said liquids to distillation to recover the solvents formed during fermentation.

9. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, separating a substantially clear liquid by filtration of the solids normally present and the coagulated solid material contained in said treated, fermented mash, subjecting said separated solids to an evaporation treatment to recover any further liquid retained therein, combining the liquid thus recovered with the clear liquid previously separated, and subjecting said liquids to distillation to recover the solvents formed during fermentation.

10. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at a period of time sufficient to insure coagulation of all said solid material, separating a substantially clear liquid from the solids normally present and the coagulated solid material contained in said treated, fermented mash, recovering further liquid retained by said separated solids, drying the residual solids, combining the liquid recovered in the last two steps with the clear liquid previously separated, and subjecting said liquids to distillation to recover the solvents formed during fermentation.

11. In the distillation of a fermented butyl mash, in the formation of which an organism of the type *Clostridium madisonii* has been used as the fermenting agent, said mash containing, in addition to the solids normally present, finely dispersed and dissolved solid organic material that causes excessive foaming during distillation, the method of substantially preventing foaming during distillation which includes heating the fermented mash prior to distillation to a temperature of 185 to 205° F., at which temperature said solid material will coagulate, maintaining the mash at this temperature for a period of 15 to 30 minutes to insure coagulation of all said solid material, separating a substantially clear liquid from the solids normally present and the coagulated solid material contained in said treated, fermented mash, recovering any further liquid retained by said separated solids, combining the liquid thus recovered with the clear liquid previously separated, and subjecting said liquids to distillation to recover the solvents formed during fermentation.

12. In the recovery of solvents from a carbohydrate-containing mash fermented by butyl alcohol-producing bacteria and containing in addition to the solvents and solids normally present finely dispersed and dissolved solid material consisting primarily of the cells of dead butyl alcohol-producing bacteria, which cause excessive foaming during distillation, the steps which comprise heating the solvent-containing mash to a temperature of at least 185° F. for a period sufficient to coagulate the residual cells of the butyl organisms, thereafter introducing the heated mash to a distillation column, distilling the solvents from the remainder of the mash, and recovering the solvents as an overhead product.

13. In the distillation of a fermented butyl mash containing, in addition to the solids normally present, finely dispersed and dissolved solid organic material that causes excessive foaming during distillation, the method of substantially preventing foaming during distillation which includes heating the fermented mash prior to distillation to a temperature at which said solid material will coagulate, maintaining the mash at this temperature for a period of time sufficient to insure coagulation of all said solid material, and then distilling the mash to separate the solvents formed during fermentation.

BENJAMIN CLARK BOECKELER.
EDWARD I. LUMMUS.
ALEX NANSEN.